United States Patent
Castaneda (10) Patent No.: US 12,171,373 B1
(45) Date of Patent: Dec. 24, 2024

(54) BLENDING SYSTEM AND BLENDING METHOD WITH SAFELY AND FAST STIR

(71) Applicant: Keira Valerie Castaneda, Clyde Hill, WA (US)

(72) Inventor: Keira Valerie Castaneda, Clyde Hill, WA (US)

( * ) Notice: Subject to any disclaimer, the term of this patent is extended or adjusted under 35 U.S.C. 154(b) by 0 days.

(21) Appl. No.: 18/773,293

(22) Filed: Jul. 15, 2024

(51) Int. Cl.
*A47J 43/00* (2006.01)
*A47J 43/046* (2006.01)
*A47J 43/07* (2006.01)
*A47J 43/08* (2006.01)

(52) U.S. Cl.
CPC ......... *A47J 43/0716* (2013.01); *A47J 43/046* (2013.01); *A47J 43/0761* (2013.01); *A47J 43/085* (2013.01)

(58) Field of Classification Search
CPC .. A47J 43/0716; A47J 43/046; A47J 43/0761; A47J 43/085
See application file for complete search history.

(56) References Cited

U.S. PATENT DOCUMENTS

| | | |
|---|---|---|
| 2014/0247686 A1 | 9/2014 | Arnett |
| 2022/0001344 A1* | 1/2022 | Zdanow ................. B01F 35/213 |
| 2024/0090704 A1* | 3/2024 | Pierce ................. A47J 43/0716 |
| 2024/0138630 A1* | 5/2024 | Schmitz ................. A47J 44/00 |

* cited by examiner

*Primary Examiner* — Anshu Bhatia
(74) *Attorney, Agent, or Firm* — NIXON PEABODY LLP (57) ABSTRACT

A blending system with safely and fast stirring a sauce is disclosed. The blending system monitors a temperature of the sauce to start heating the sauce if the sauce is at a frozen state. Then after the sauce quits from the frozen state, the blending system stirs the sauce with a relatively low speed at first, and then stirs the sauce with a relatively high speed.

10 Claims, 5 Drawing Sheets

BLENDING SYSTEM AND BLENDING METHOD WITH SAFELY AND FAST STIR

BACKGROUND OF THE INVENTION

Tomato ketchup is widely popular for its excellent taste and great nutrition. The tomato ketchup is made from fresh tomatoes through a plurality of processes such as peeling, stirring, and pressing. Then the prepared tomato ketchup is typically stored in a refrigerator, which causes the tomato ketchup to be at a low temperature, or even at a frozen state. The low temperature or the frozen state weakens the flowability of the ketchup, which brings inconvenience when fetching the ketchup.

SUMMARY OF THE INVENTION

In accordance with an embodiment of the present invention, a blending system switching mode power supply is discussed. The blending system comprises a blender base and a blender container. The blender base has a button, a motor, and a controller. The blender container has a shaft and a couple of blending strings. The shaft is electrically coupled to the motor and the controller. The controller includes: a first comparator, a second temperature comparator, a heater, and a driver. The first comparator is configured to compare a temperature sense signal indicative of a temperature of a target sauce with a first reference temperature in response to an activation at the button, to generate a first comparison signal. The second temperature comparator is configured to compare the temperature sense signal with a second reference temperature, to generate a second comparison signal. The heater is configured to generate a heat signal to start to heat the shaft if the temperature sense signal is lower than the reference temperature, and to stop to heat the shaft when the temperature sense signal is higher than the second reference temperature. The driver is configured to start to drive the motor when the temperature sense signal is higher than the second reference temperature, to control the blending strings to stir the target sauce.

In addition, in accordance with an embodiment of the present invention, a blending system is discussed. The blending system comprises: a blender base and a blender container. The blender base has a button, a motor, and a controller. The blender container has a shaft and a couple of blending strings. The shaft is electrically coupled to the motor and the controller. The controller includes: a comparator, a delay circuit, a heater, and a driver. The comparator is configured to compare a temperature sense signal indicative of a temperature of a target sauce with a reference temperature in response to an enable signal delivered from the button, to generate a comparison signal. The delay circuit is configured to postpone the enable signal with a short time length, to generate a delay signal. The heater is configured to be enabled by the comparator when the temperature sense signal is lower than the reference temperature, to generate a heat signal, to control the shaft to be heated. The driver is configured to be enabled by the delay signal, to drive the motor and to control the blending strings to stir the target sauce.

Furthermore, in accordance with an embodiment of the present invention, a blending method is discussed. The blending method comprises: inserting a shaft and blending strings into a bottle with a target sauce; pressing a button to activate a blending system; monitoring a temperature of the target sauce: if the temperature is lower than a first reference temperature, starting to heat the shaft until the temperature reaches a second reference temperature; and if the temperature is not lower than the first reference temperature, starting the blending system to drive a motor to control the blending strings to stir the target sauce; stirring the target sauce with a first stirring speed for a first time length; and stirring the target sauce with a second stirring speed for a second time length, wherein the first stirring speed is lower than the second stirring speed.

DETAILED DESCRIPTION OF THE INVENTION

Embodiments of circuits for switching mode power supply are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
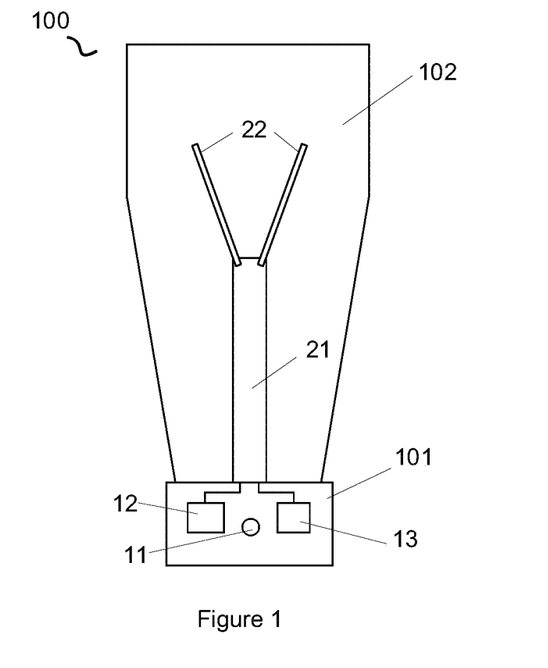
FIG. 1 schematically shows a blending system 100 in accordance with an embodiment of the present invention.

FIG. 1 schematically shows a blending system 100 in accordance with an embodiment of the present invention. In one embodiment of the present invention, the blending system 100 is used to stir tomato ketchup. However, one skilled in the art should realize that the blending system 100 may also be used to stir other sauces.

In the example of FIG. 1, the blending system 100 comprises: a blender base 101 and a blender container 102. The blender base 101 includes a button 11, a motor 12, and a controller 13. The blender container 102 includes a shaft 21 and a couple of blending strings 22. The shaft 21 is electrically coupled to the motor 12 and the controller 13.

When the blending system is in use, the button 11 is pressed by an outside pressure (e.g., by fingers) to start up the system. The motor 12 would be controlled by the controller 13, to drive the shaft 21 and the blending strings 22 to stir the target sauce. That is, upon an activation at the button 11, the shaft 21 and the blending strings 22 are driven by the motor 12 under the control of the controller 13. With the movement of the shaft 21 and the blending strings 22, the sauce is stirred.

The shaft 21 may be made of a material that can be heated. For example, the shaft 21 may comprise a heating element. In response to a startup of the blending system, the shaft 21 may be heated under the control of the controller 13, so as to transfer the heat to the frozen sauce, to speed up the melt process.

In one embodiment of the present invention, the blending strings 22 may be replaced by a couple of blending blades, which are made of hard material such as metal, to easily stir the icy sauce.

In one embodiment of the present invention, the shaft 21 and the blending strings 22 are assembled on the blender base 101. The blender container 102 may be a cover of the blender base 101, to protect the shaft 21 and the blending strings 22 from damage. The blender container 102 can be removable from the blending system during the use, so that the shaft and the blending strings can inserted into a bottle with the target sauce (e.g., a bottle of frozen ketchup), to perform the stirring. For example, the blender base 101 may have helical shape at its opening, to facilitate the removal of the cover.

Figure 2:
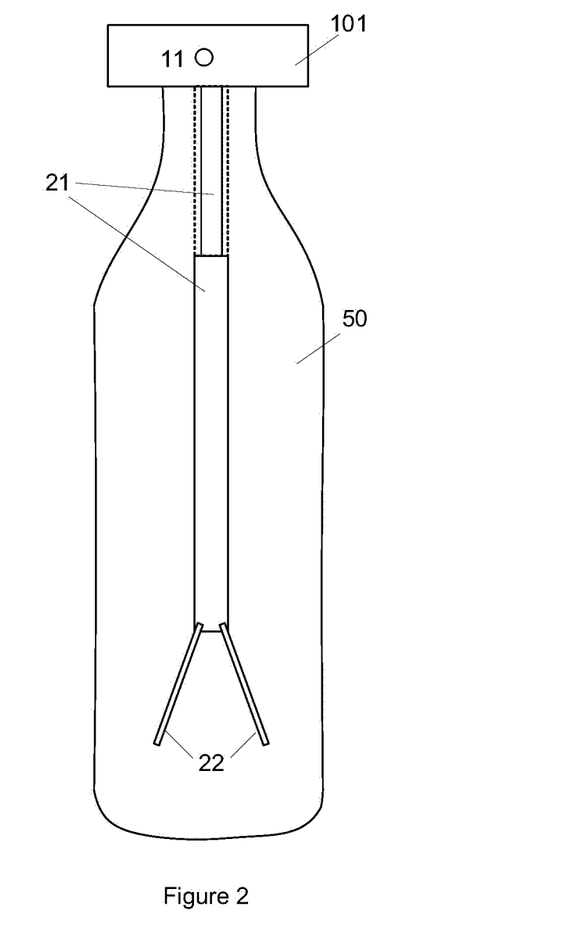
FIG. 2 schematically shows the shaft 21 and the blending strings 22 being inserted into a bottle 50 to stir the target sauce in accordance with an embodiment of the present invention.

FIG. 2 schematically shows the shaft 21 and the blending strings 22 being inserted into a bottle 50 to stir the target sauce in accordance with an embodiment of the present invention. As shown in FIG. 2, the length of the shaft 21 is adjustable. That is, the shaft 21 is stretchable, so that the shaft 21 can be inserted into deep of the bottle, to control the blending strings to fully stir the sauce when the button 11 in the blender base 101 is activated.

The control principle of the controller 13 will be illustrated below with reference to FIG. 3 to FIG. 7.

Figure 3:
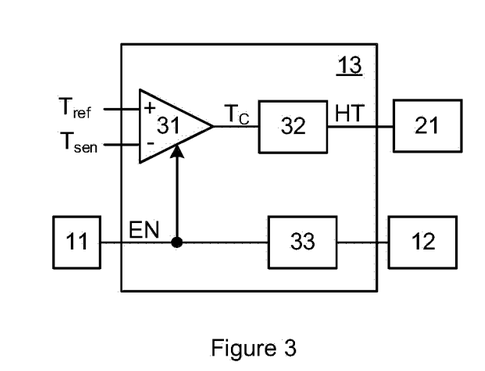
FIG. 3 schematically shows a circuit configuration of the controller 13 in accordance with an embodiment of the present invention.

FIG. 3 schematically shows a circuit configuration of the controller 13 in accordance with an embodiment of the present invention. In the example of FIG. 3, the controller 13 comprises: a comparator 31, a heater 32, and a driver 33. Upon an activation at the button 11, an enable signal EN is delivered to the temperature comparator 31 to activate the temperature comparator 31 and the driver 33. The comparator 31 is configured to compare a temperature sense signal $T_{sen}$ indicative of a temperature of the target sauce with a reference temperature $T_{ref}$ to generate a comparison signal Tc. The heater 32 is configured to be enabled by the comparator 31 when the temperature sense signal $T_{sen}$ is lower than the reference temperature $T_{ref}$ to generate a heat signal HT, to control the shaft 21 to be heated, so that the target sauce is quickly thawed. The driver 33 is configured to drive the motor 12 in response to the enable signal EN, to control the blending strings 22 to stir the target sauce.

In one embodiment of the present invention, the reference temperature $T_{ref}$ may be set around 32 degrees fahrenheit (i.e., zero degrees centigrade), to judge whether the sauce is at a frozen state.

Figure 4:
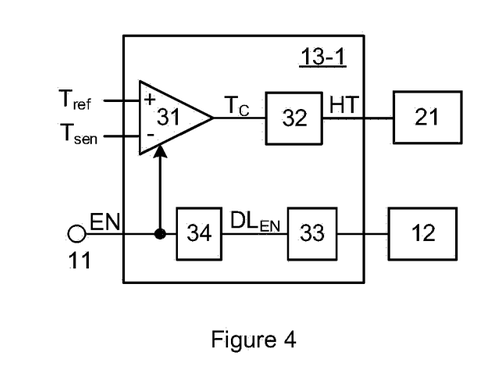
FIG. 4 schematically shows a circuit configuration of the controller 13-1 in accordance with an embodiment of the present invention.

FIG. 4 schematically shows a circuit configuration of the controller 13-1 in accordance with an embodiment of the present invention. The controller 13-1 in FIG. 4 is similar to the controller 13 in FIG. 3, with a difference that, in the example of FIG. 4, the controller 13-1 further comprises: a delay circuit 34, configured to postpone the enable signal EN with a short time length, to generate a delay signal $DL_{EN}$. The driver 33 is enabled by the delay signal $DL_{EN}$.

The delay circuit 34 may be realized by a RC circuit, i.e., the delay circuit 34 may be formed by a resistor and a capacitor. The short time length may be set as 1 second. That is, the driver 33 may be enabled 1 second later than the comparator 31, so that the target sauce is first heated to be unfrozen, and then the driver 33 is activated to drive the motor 12, which drives the blending strings 22 to start stirring the unfrozen sauce.

In one embodiment of the present invention, the driver 33 may be enabled when the temperature of the sauce reaches a certain temperature value, which indicates that the sauce is thawed from a frozen state.

Figure 5:
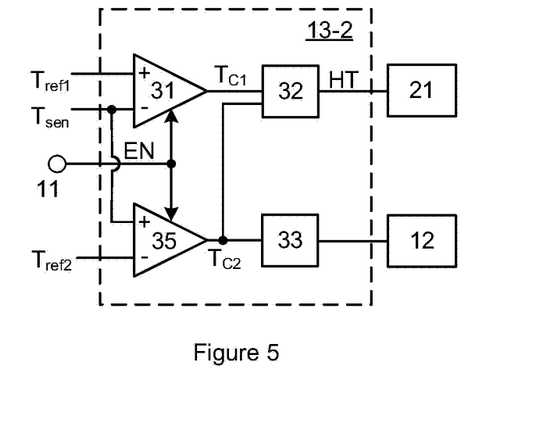
FIG. 5 schematically shows a circuit configuration by the controller 13-2 in accordance with an embodiment of the present invention.

FIG. 5 schematically shows a circuit configuration of the controller 13-2 in accordance with an embodiment of the present invention. In the example of FIG. 5, the controller 13-2 comprises: a first temperature comparator 31, a heater 32, a driver 33, and a second temperature comparator 35. Upon an activation at the button 11, an enable signal EN is delivered to the first temperature comparator 31 and the second temperature comparator 35. The first temperature comparator 31 is configured to compare a temperature sense signal $T_{sen}$ indicative of a temperature of the target sauce with a first reference temperature Tref1, to generate a first comparison signal $T_{C1}$. The second temperature comparator 35 is configured to compare the temperature sense signal Tsen with a second reference temperature $T_{ref2}$, to generate a second comparison signal $T_{C2}$. The heater 32 is configured to generate a heat signal HT to start to heat the shaft 21 if the temperature sense signal Tsen is lower than the reference temperature $T_{ref}$, to control the target sauce to be quickly thawed from a frozen state; and the heater 32 is configured to stop to heat the shaft 21 when the temperature sense signal Tsen is higher than the second reference temperature $T_{ref2}$, to prevent the target sauce to be further heated. The driver 33 is configured to start to drive the motor 12 when the temperature sense signal $T_{sen}$ is higher than the second reference temperature $T_{ref2}$, to control the blending strings 22 to stir the target sauce.

In one embodiment of the present invention, the first reference temperature $T_{ref1}$ may be set around 32 degrees fahrenheit (i.e., zero degree centigrade); and the second reference temperature $T_{ref2}$ may be set around 35.6 degrees fahrenheit (i.e., two degrees centigrade).

That is, when the temperature of the target sauce is lower than a freezing point, e.g., 30 degrees fahrenheit, which means the targe sauce is probably at a frozen state, the blending system first heats the target sauce with no stirring action, so as to protect the blending strings. When the temperature of the target sauce is higher than a certain value, e.g., 35.6 degrees fahrenheit, which means the target sauce is no longer at the frozen state, the blending system stops the heating to maintain an icy taste and starts to drive the blending strings, so as to quick stir the target sauce.

In one embodiment of the present invention, the driver 33 is configured to drive the motor 12 with a first drive capability for a first time length at first, so as to control the blending strings 22 to stir the target sauce with a first stirring speed; and the driver 33 is configured to drive the motor 12 with a second drive capability for a second time length when the first time length is over, so as to control the blending strings 22 to stir the target sauce with a second stirring speed. The first drive capability is lower than the second drive capability, so that the first stirring speed is lower than the second stirring speed.

Figure 6:
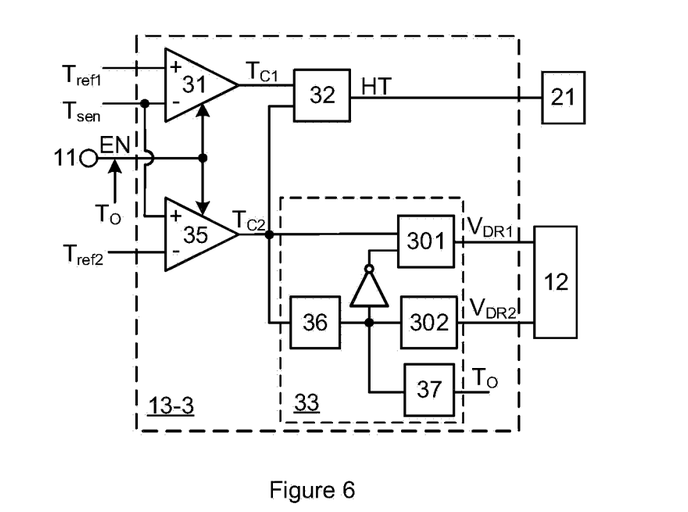
FIG. 6 schematically shows a circuit configuration of the controller 13-3 with a circuit configuration of the driver 33 in accordance with an embodiment of the present invention.

In one embodiment of the present invention, the driver 33 may be configured to drive the motor 12 with the first drive capability for the first time length when the temperature sense signal $T_{sen}$ is higher than the second reference temperature $T_{ref2}$, as shown with reference to FIG. 6. In other embodiments of the present invention, the driver 33 may be configured to drive the motor 12 with the first drive capability for the first time length in response to the delay signal $DL_{EN}$ (i.e., when the enable signal is delayed for the short time length), as shown with reference to FIG. 7.

FIG. 6 schematically shows a circuit configuration of the controller 13-3 with a circuit configuration of the driver 33 in accordance with an embodiment of the present invention. In the example of FIG. 6, the driver 33 comprises: a first drive circuit 301, a second drive circuit 302, a first timer 36, and a second timer 37. The first drive circuit 301 is configured to provide the first drive capability $V_{DR1}$ to the motor 12 for the first time length when the temperature sense signal $T_{sen}$ is higher than the second reference temperature $T_{ref2}$. The first timer 36 is configured to start to timing the first time length when the temperature sense signal $T_{sen}$ is higher than the second reference temperature $T_{ref2}$. The second drive circuit 302 is configured to provide the second drive capability $V_{DR2}$ to the motor 12 when the first time length is over. The second timer 37 is configured to start to timing the second time length when the first time length is over, and to generate a time over signal $T_O$ when the second time length is over. The time over signal $T_O$ is configured to pull low the enable signal EN, to deactivate (i.e. disable) the blending system and stop the stirring.

Figure 7:
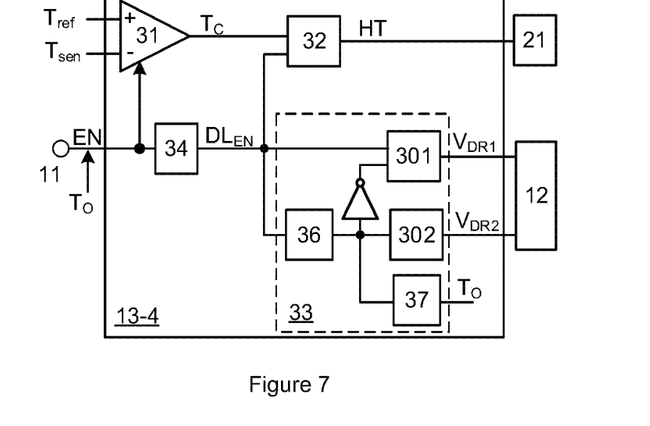
FIG. 7 schematically shows a circuit configuration of the controller 13-4 with a circuit configuration of the driver 33 in accordance with an embodiment of the present invention.

FIG. 7 schematically shows a circuit configuration of the controller 13-4 with a circuit configuration of the driver 33 in accordance with an embodiment of the present invention. In the example of FIG. 7, the driver 33 comprises: a first drive circuit 301, a second drive circuit 302, a first timer 36, and a second timer 37. The first drive circuit 301 is configured to provide the first drive capability $V_{DR1}$ to the motor 12 for the first time length in response to the delay signal $DL_{EN}$. The first timer 36 is configured to start to timing the first time length in response to the delay signal $DL_{EN}$. The second drive circuit 302 is configured to provide the second drive capability $V_{DR2}$ to the motor 12 when the first time length is over. The second timer 37 is configured to start to timing the second time length when the first time length is over, and to generate a time over signal $T_O$ when the second time length is over. The time over signal $T_O$ is configured to pull low the enable signal EN, to deactivate (i.e. disable) the blending system and stop the stirring.

Figure 8:
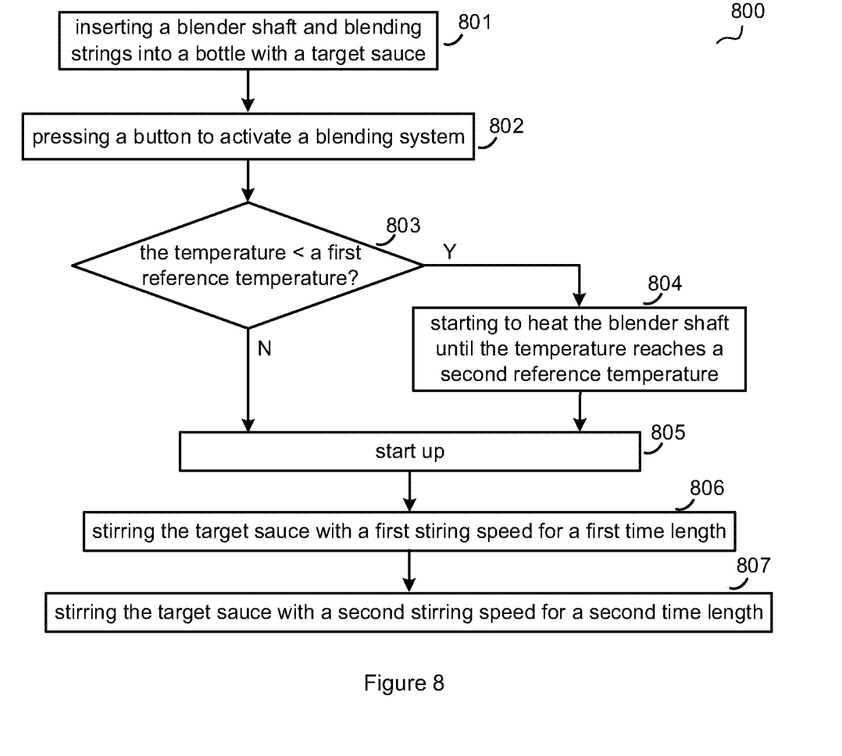
FIG. 8 schematically shows a flowchart 800 of a blending method in accordance with an embodiment of the present invention.

FIG. 8 schematically shows a flowchart 800 of a blending method in accordance with an embodiment of the present invention. The method comprises:

Step 801, inserting a shaft and blending strings into a bottle with a target sauce. The target sauce may comprise tomato ketchup or other sauces.

Step 802, pressing a button to activate a blending system. Upon an activation at the button, the blending system is started up. Then a controller is operable to control a motor, which drives a shaft and blending strings to stir the target sauce.

Step 803, monitoring a temperature of the target sauce, if the temperature is lower than a first reference temperature, turning to step 804; if the temperature is not lower than the first reference temperature, turning to step 805. The first reference temperature may be for example set around 32 degrees fahrenheit (i.e., zero degree centigrade), to judge whether the target sauce is at a frozen state.

Step 804, starting to heat the shaft until the temperature reaches a second reference temperature. The second reference temperature $T_{ref2}$ may be set around 35.6 degrees fahrenheit (i.e., two degrees centigrade). In this step, the target sauce is at the frozen state. By heating of the shaft, the heat would be transferred to the sauce to quickly unfreeze the sauce, to have the temperature of the target sauce rise to be higher than zero degree centigrade, i.e., to have the target sauce be thawed from the frozen state.

Step 805, starting the blending system to drive a motor to control the blending strings to stir the target sauce. In this step, the target sauce is not at the frozen state. The blending system starts to power the controller and the motor, to drive the blending systems to stir the sauce.

Step 806, stirring the target sauce with a first stirring speed for a first time length. In one embodiment of the present invention, the first stirring speed is relatively low. Some of the sauce may still be icy at the beginning of the stirring process. Thus, controlling the blending system to attempt to start the stirring with a relatively low speed would ensure the safety of the stirring, to prevent the blending strings from being damaged. And Step 807, stirring the target sauce with a second stirring speed for a second time length, wherein the second stirring speed is higher than the first stirring speed. That is, the second stirring speed is relatively high. Because the sauce has been stirred with the first stirring speed for the first time length, no icy sauce would be in the bottle. Then, stirring the sauce with the second stirring speed which is relatively high would have the sauce be fully stirred.

In one embodiment of the present invention, the first time length and the second time length are programmable.

In one embodiment of the present invention, the method further comprises: deactivating the blending system to stop stirring when the second time length is over.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

The invention claimed is:

1. A blending system, comprising:
    a blender base, having a button, a motor, and a controller; and
    a blender container, having a shaft and a couple of blending strings, wherein the shaft is electrically coupled to the motor and the controller, and wherein the controller includes:
        a first comparator, configured to compare a temperature sense signal indicative of a temperature of a target sauce with a first reference temperature in response to an activation at the button, to generate a first comparison signal;
        a second temperature comparator, configured to compare the temperature sense signal with a second reference temperature, to generate a second comparison signal;
        a heater, configured to generate a heat signal to start to heat the shaft if the temperature sense signal is lower than the reference temperature, and to stop to heat the shaft when the temperature sense signal is higher than the second reference temperature; and a driver, configured to start to drive the motor when the temperature sense signal is higher than the second reference temperature, to control the blending strings to stir the target sauce.

2. The blending system of claim 1, wherein:

the shaft comprises a heating element.

3. The blending system of claim 1, wherein:

the driver is configured to drive the motor with a first drive capability for a first time length when the temperature sense signal is higher than the second reference temperature, so as to control the blending strings to stir the target sauce with a first stirring speed; and the driver is configured to drive the motor with a second drive capability for a second time length when the first time length is over, so as to control the blending strings to stir the target sauce with a second stirring speed; and wherein the first drive capability is lower than the second drive capability, and the first stirring speed is lower than the second stirring speed.

4. The blending system of claim 3, wherein the driver comprises:

a first drive circuit, configured to provide the first drive capability to the motor for the first time length when the temperature sense signal is higher than the second reference temperature;

a first timer, configured to start to timing the first time length when the temperature sense signal is higher than the second reference temperature;

a second drive circuit, configured to provide the second drive capability to the motor for the second time length when the first time length is over; and a second timer, configured to start to timing the second time length when the first time length is over, and to generate a time over signal when the second time length is over.

5. The blending system of claim 4, wherein:

the time over signal is configured to deactivate the blending system.

6. A blending system, comprising:

a blender base, having a button, a motor, and a controller; and a blender container, having a shaft and a couple of blending strings, wherein the shaft is electrically coupled to the motor and the controller, and wherein the controller includes:

a comparator, configured to compare a temperature sense signal indicative of a temperature of a target sauce with a reference temperature in response to an enable signal delivered from the button, to generate a comparison signal;

a delay circuit, configured to postpone the enable signal with a short time length, to generate a delay signal;

a heater, configured to be enabled by the comparator when the temperature sense signal is lower than the reference temperature, to generate a heat signal, to control the shaft to be heated; and a driver, configured to be enabled by the delay signal, to drive the motor and to control the blending strings to stir the target sauce.

7. The blending system of claim 6, wherein:

the shaft comprises a heating element.

8. The blending system of claim 6, wherein:

the driver is configured to drive the motor with a first drive capability for a first time length in response to the delay signal, so as to control the blending strings to stir the target sauce with a first stirring speed; and the driver is configured to drive the motor with a second drive capability for a second time length when the first time length is over, so as to control the blending strings to stir the target sauce with a second stirring speed; and wherein the first drive capability is lower than the second drive capability, and the first stirring speed is lower than the second stirring speed.

9. The blending system of claim 8, wherein the driver comprises:

a first drive circuit, configured to provide the first drive capability to the motor for the first time length in response to the delay signal;

a first timer, configured to start to timing the first time length in response to the delay signal;

a second drive circuit, configured to provide the second drive capability to the motor for the second time length when the first time length is over; and a second timer, configured to start to timing the second time length when the first time length is over, and to generate a time over signal when the second time length is over.

10. The blending system of claim 9, wherein:

the time over signal is configured to pull low the enable signal to deactivate the blending system.

* * * * *

UNITED STATES PATENT AND TRADEMARK OFFICE
CERTIFICATE OF CORRECTION

| | | |
|---|---|---|
| PATENT NO. | : 12,171,373 B1 | Page 1 of 1 |
| APPLICATION NO. | : 18/773293 | |
| DATED | : December 24, 2024 | |
| INVENTOR(S) | : Keira Valerie Castaneda | |

It is certified that error appears in the above-identified patent and that said Letters Patent is hereby corrected as shown below:

On the Title Page

Item (54) and In the Specification, Column 1, Lines 1-2, please delete "BLENDING SYSTEM AND BLENDING METHOD WITH SAFELY AND FAST STIR" and insert --BLENDING SYSTEM WITH SAFE AND FAST STIR-- therefor.

Signed and Sealed this
Twenty-fifth Day of March, 2025

Coke Morgan Stewart
*Acting Director of the United States Patent and Trademark Office*